United States Patent
Levy

(10) Patent No.: US 10,473,405 B2
(45) Date of Patent: Nov. 12, 2019

(54) SYSTEM AND METHOD FOR COOLING A BODY

(71) Applicant: ISRAEL AEROSPACE INDUSTRIES LTD., Lod (IL)

(72) Inventor: Shahar Levy, Gderot (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 145 days.

(21) Appl. No.: 15/685,559

(22) Filed: Aug. 24, 2017

(65) Prior Publication Data
US 2018/0080719 A1 Mar. 22, 2018

(30) Foreign Application Priority Data
Sep. 21, 2016 (IL) .......................................... 247964

(51) Int. Cl.
| | |
|---|---|
| F28D 15/06 | (2006.01) |
| B64G 1/50 | (2006.01) |
| F28F 13/10 | (2006.01) |
| B64G 1/58 | (2006.01) |
| B64G 6/00 | (2006.01) |

(52) U.S. Cl.
CPC .............. *F28D 15/06* (2013.01); *B64G 1/50* (2013.01); *B64G 1/58* (2013.01); *B64G 6/00* (2013.01); *F28F 13/10* (2013.01)

(58) Field of Classification Search
CPC . F28D 15/06; F28F 13/10; B64G 1/50; B64G 1/58; B64G 6/00
See application file for complete search history.

(56) References Cited

U.S. PATENT DOCUMENTS

| | | | |
|---|---|---|---|
| 3,212,286 A | 10/1965 | Curtis | |
| 3,463,150 A | 8/1969 | Penfold | |
| 3,613,775 A | 10/1971 | Curtis | |
| 4,687,048 A | 8/1987 | Edelstein et al. | |
| 5,021,924 A * | 6/1991 | Kieda | H01L 23/4336 165/104.33 |
| 5,070,702 A | 12/1991 | Jackson | |
| 5,092,129 A | 3/1992 | Bayes et al. | |
| 5,220,804 A * | 6/1993 | Tilton | B64G 1/50 257/E23.088 |

(Continued)

FOREIGN PATENT DOCUMENTS

JP 2006077410 A 3/2006

*Primary Examiner* — Devon Russell
(74) *Attorney, Agent, or Firm* — Dorsey & Whitney LLP

(57) ABSTRACT

A system and method for cooling an external surface of a heat conductive body heated by a heat source is provided. The system includes a tank containing an evaporation liquid, a conduit supplying the evaporation liquid to the external surface of the body, a controllable supply valve for regulating a flow rate of egress of the evaporation liquid from the tank, and a control unit for controlling operation of the supply valve. The control unit includes a temperature sensor producing a temperature sensor signal representative of the temperature of the body at the predetermined place; and a controller capable of generating control signals for controlling operation of the controllable supply valve to provide a pulsed supply of the evaporation liquid to the external surface of the body for obtaining a desired temperature decrease of the body.

7 Claims, 2 Drawing Sheets

(56) References Cited

U.S. PATENT DOCUMENTS

| | | | | |
|---|---|---|---|---|
| 6,026,816 | A * | 2/2000 | McMillan | A61B 18/20 |
| | | | | 128/898 |
| 6,108,201 | A * | 8/2000 | Tilton | H05K 7/20345 |
| | | | | 165/104.33 |
| 6,550,263 | B2 * | 4/2003 | Patel | H01L 23/4735 |
| | | | | 165/80.4 |
| 6,650,542 | B1 * | 11/2003 | Chrysler | H01L 23/4735 |
| | | | | 165/104.33 |
| 2001/0001983 | A1 * | 5/2001 | Kim | H01L 23/467 |
| | | | | 165/299 |
| 2002/0112491 | A1 * | 8/2002 | Malone | F28D 15/06 |
| | | | | 62/171 |
| 2004/0040328 | A1 * | 3/2004 | Patel | H01L 23/4336 |
| | | | | 62/259.2 |
| 2004/0123975 | A1 * | 7/2004 | Lee | F28D 5/00 |
| | | | | 165/11.1 |
| 2005/0185378 | A1 * | 8/2005 | Tilton | H05K 7/20345 |
| | | | | 361/699 |
| 2006/0214177 | A1 * | 9/2006 | Jones | F21V 29/30 |
| | | | | 257/99 |
| 2007/0230126 | A1 * | 10/2007 | Pautsch | H01L 23/4735 |
| | | | | 361/699 |
| 2011/0060322 | A1 * | 3/2011 | Manstein | A61B 18/203 |
| | | | | 606/9 |

* cited by examiner

SYSTEM AND METHOD FOR COOLING A BODY

TECHNOLOGICAL FIELD

This invention relates to cooling systems, and in particular, to a system and method for cooling an external surface of a body, which is heated by a heat source and located in a low-pressure environment.

BACKGROUND

Systems are known in the art, which are designed for cooling objects located in a low-pressure environment. For example, during space exploration, it is important to control the temperature of the surface and the body of the space vehicle in order to dissipate the waste heat generated by electronics of the space vehicle, and any heat absorbed by the vehicle shell due to external radiation emanated from the sun. Likewise, it is important to control the temperature of a spacesuit to dissipate the metabolic heat of the suit inhabitant.

For example, U.S. Pat. No. 3,212,286 describes a spacesuit having a thermally conductive wall with a plurality of porous metal block evaporators distributed over and in good thermal contact with the exterior of the wall. The metal blocks act as constant temperature heat sinks, dissipating into space the heat transferred to them by the suit wall.

The evaporators are supplied by a water evaporant from a reservoir within the spacesuit, the water being under the atmospheric pressure of the suit. On first entering the evaporator, the water does not immediately freeze, due to its own vapor pressure, and wetting of the interior surfaces of the evaporator block occurs. Then, the water freezes and then sublimes to remove heat from the block. As sublimation proceeds, passages open to admit more water, thus sustaining the cooling process.

U.S. Pat. No. 3,613,775 describes a cooling system for removing metabolic heat in a life support system used in space activity. In operation, coolant passes through a sublimator which also includes a pump and a coolant garment. A separate water storage container provides feedwater to the sublimator where it is sublimated along a surface thermally connected to a heat exchange element through which the coolant flows.

U.S. Pat. No. 5,092,129 describes an apparatus for removing heat energy of a cooling medium passing from a spacesuit liquid cooling garment. The apparatus includes a heat sink assembly for absorbing and rejecting the heat energy and a heat transfer means for transferring the heat energy of the cooling medium to the heat sink assembly. The heat transfer means, which is comprised of an array of thermoelectric modules, regulates the quantity of heat energy transferred from the cooling medium to the heat sink assembly. The heat sink assembly includes a material that isothermally changes phase while absorbing heat energy.

GENERAL DESCRIPTION

Despite prior art in the area of cooling for cooling a body, which is located in a low-pressure environment, there is still a need in the art for further improvement in order to provide a novel system that can provide controllable temperature decrease of the body at a predetermined place.

The present invention satisfies the aforementioned needs in the art by providing a novel system for cooling an external surface of a heat conductive body heated by a heat source.

According to an embodiment of the present invention, the cooling system includes a tank containing an evaporation liquid having a pressure greater than a pressure of an environment near the external surface. The environment can, for example, be a low-pressure environment, such as vacuum or upper layers of the earth's atmosphere.

The cooling system also includes a conduit being in hydraulic communication with the tank and configured to supply the evaporation liquid to the external surface of the body.

The cooling system also includes a controllable supply valve arranged within the conduit. The controllable supply valve is configured for regulating a flow rate of egress of the evaporation liquid from the tank.

The system further includes a control unit operatively coupled to the controllable discharge valve. The control unit is configured for controlling operation thereof for supply of the evaporation liquid. The control unit includes a temperature sensor arranged within the body at a predetermined place and configured for producing a temperature sensor signal representative of the temperature of the body at the predetermined place, and a controller operatively coupled to the temperature sensor and to the controllable supply valve. The controller is responsive to the temperature sensor signal and is capable of generating control signals for controlling operation of the controllable supply valve. Controlling operation of the controllable supply valve is carried out by turning it "on" or "off", thereby providing a pulsed supply of the evaporation liquid to the external surface of the body as long as required for obtaining a desired temperature decrease of the body at the predetermined place.

According to an embodiment of the present invention, the control unit includes a flow meter and a flow rate valve arranged in the conduit. The flow meter is configured for measuring the flow rate of the evaporation liquid in the conduit, and the flow rate valve is configured to regulate the flow rate.

According to an embodiment of the present invention, the pulsed supply of the evaporation liquid is characterized by a duration $\Delta t$ of the liquid supply pulses and an operating frequency of the controllable supply valve.

According to an embodiment of the present invention, the duration $\Delta t$ of each pulse of the pulsed supply of the evaporation liquid is obtained by $\Delta t = Mc\Delta T/LJ$, where M is the mass of the body, c is the specific heat capacity of the body, $\Delta T$ is the desired temperature decrease; L is the latent heat of evaporation of the evaporation liquid, and J is the flow rate of the evaporation liquid through the conduit.

According to an embodiment of the present invention, an operating frequency of the controllable supply valve is obtained by $f = W/LJ\Delta t$, where W is the heat power of the heat source.

According to an embodiment of the present invention, an inner volume of the conduit between the controllable supply valve and an opening through which the evaporation liquid is supplied to the external surface of the body has a predetermined value obtained by $\Delta V = Mc\Delta T/L\rho$, where $\rho$ is the density of the evaporation liquid.

According to an embodiment of the present invention, the cooling system further includes a grid arranged over the external surface of the heat conductive body at a predetermined distance. The grid is configured for catching the evaporation liquid provided by the conduit, and holding the evaporation liquid in a gap between the grid and the external surface.

The present invention also satisfies the aforementioned needs in the art by providing a novel method for cooling an external surface of a heat conductive body. The method includes controlling operation of the controllable supply valve by turning it "on" or "off", thereby providing a pulsed supply of the evaporation liquid to the external surface of the body as long as required, for obtaining a desired temperature decrease of the body at the predetermined place.

The system for cooling of the present invention has many of the advantages of the prior art techniques, while simultaneously overcoming some of the disadvantages normally associated therewith.

The system for cooling of the present invention can be used for a broad range of cooling purposes. These include cooling relatively small heat sources, such as small electronic components. For such a purpose, the cooling system can be used with a heat conductive body abated to the electronic component, such as a relatively thin aluminum plate having a conduit terminated with one or more orifices on its external surface. The cooling unit can be few millimeters thick. This means that it can be attached to the heat source with almost no total volume increase. This modularity also allows simple replacement of any damaged components of the cooling system.

Since a conduit can be very narrow (i.e., with a diameter less than a millimeter), for certain heat source designs, the conduit itself can be engraved in the heat source bulk or skin.

For relatively large heat sources, a plurality of heat conductive bodies can be attached to the heat source around the outer surfaces for effective cooling.

The cooling system according to the present invention may be readily conformed to complexly shaped surfaces and contours of a body. In particular, it can be readily conformable to various three dimensional bodies having complex non-uniform shapes.

The cooling system according to the present invention may be efficiently manufactured.

The installation of the cooling system to a body is relatively quick and easy and can be accomplished without substantial altering the platform, in which it is to be associated.

The cooling system according to the present invention is of durable and reliable construction.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
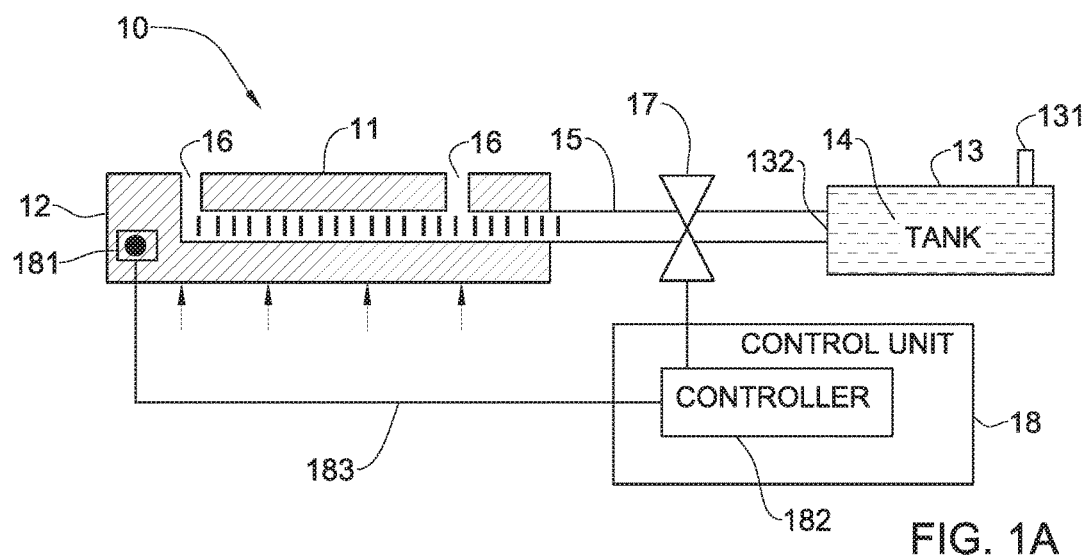
FIG. 1A illustrates a general schematic view of a cooling system, according to one embodiment of the present invention.

The principles and operation of the cooling system and method for cooling an external surface of a heat conductive body according to the present invention may be better understood with reference to the drawings and the accompanying description, it being understood that these drawings and examples in the description are given for illustrative purposes only and are not meant to be limiting. The same reference Roman numerals and alphabetic characters will be utilized for identifying those components which are common in the cooling system and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow hereinbelow, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Unless specifically stated otherwise, throughout the description, utilizing terms such as computing or "calculating" or determining or "obtaining" or the like, refer to the action and processes of a computer system, or similar electronic processing device, that manipulates and transforms data.

According to the present invention, the cooling of a heat conductive body is based on applying discrete doses (pulses) of evaporation liquid (evaporant) onto an external surface of the body. In the present application, the terms "evaporant" and "evaporation liquid" are used interchangeably.

According to an embodiment, the external surface of the body is exposed to a low-pressure environment. The term "low-pressure" is broadly used herein to refer to any pressure less than the saturated vapor pressure of the evaporation liquid used in the system of the present invention, i.e., to any pressure at which a vapor of the evaporation liquid is in unsaturated state.

Examples of a low-pressure environment include, but are not limited to, a space vacuum and upper layers of the earth's atmosphere. The term "body" is broadly used in the present description and the claims to describe any object having at least one surface exposed to a low-pressure environment. Examples of a body with an external surface (shell) exposed to a low-pressure environment include, but are not limited to, a spacesuit and a space vehicle located in the space vacuum or in the upper layers of the earth's atmosphere. Examples of a body with an external surface (shell) exposed to a low-pressure environment also include, various modules (electrical, optical, mechanical) of any system in the space vacuum or in the upper layers of the earth's atmosphere.

Once the evaporant reaches the external surface it evaporates, and thereby cools the body by drawing the heat away from the surface of the body. For example, an evaporant such as water has a latent heat of vaporization of 2461 kJ/kg, which makes evaporative cooling with water an effective process for dissipating unwanted heat.

Ability to control the dose size and frequency of the evaporant dose pulses enables controlling the cooling power applied to the body. For instance, relatively small and frequently applied doses of an evaporation liquid can be applied to achieve very accurate temperature control for small heat power systems. On the other hand, large doses can be used when the body is heated by a great heating power. The cooling control scheme of the present invention resembles a pulse width modulation (PWM) control scheme, providing controlling of duration of the evaporant supply (pulse width) and frequency of the evaporant supply.

Referring now to FIG. 1A, a schematic view of a cooling system 10 for cooling an external surface 11 of a heat conductive body 12 heated by a heat source (not shown) is illustrated, according to one embodiment of the present invention. Arrows in FIG. 1A illustrate heat transfer to the heat conductive body 12. The body 12 can be heated by any heat transfer mechanism. For example, a heat source can be directly attached to the body 12, and provide heat transfer by a heat conduction mechanism. Alternatively, a heat source can radiate heat energy towards the body 12, and heat the body 12 by a heat radiation mechanism. Likewise, when the body 12 is separated from a heat source by a fluid (e.g., liquid or gas), heat transfer in can be implemented via a convection mechanism. It should also be understood that the heat source can be integrated with the body 12 and be a part of it.

According to an embodiment, the cooling system 10 includes a tank 13 comprising an evaporation liquid 14. The evaporation liquid in the tank 13 has a pressure greater than the pressure of the environment near the external surface 11. It is preferable, but not mandatory, that the whole body 12, or at least its external surface 11, is located in a low-pressure environment.

The term "tank" is broadly used to describe any container, chamber or vessel that can be used for holding the evaporation liquid 14 at a desired pressure. The tank 13 has an inlet port 131 for filling the tank and an outlet port 132 for releasing the evaporation liquid 14.

The material of the evaporation liquid affects the wetting characteristics of the external surface 11. Therefore, depending on the material of the external surface 11, the evaporation liquid is selected having molecules attractable to the molecules of the external surface 11. Moreover, density and viscosity of the evaporation liquid effect its flow rate J. Other physical properties, for example, latent heat of evaporation of the evaporation liquid, and chemical properties, such as toxicity or corrosion, should also be taken into account in selection of the material for the evaporation liquid 14. Examples of an evaporation liquid suitable for the purpose of the present invention include, but are not limited to, water, methanol, ethanol, acetone, etc.

The cooling system 10 also includes a conduit 15 being in hydraulic communication with the outlet port 132 of the tank 13, and configured to supply the evaporation liquid 14 to the external surface 11 of the body 12. As illustrated in FIG. 1A, the conduit 15 is formed as a channel within the body 12 and includes one or more outlet orifices 16 to the external surface 11, however other configurations of the conduit 15 are also contemplated.

The cooling system 10 also includes a controllable supply valve 17 arranged within the conduit 15, and configured for regulating a flow rate of egress of the evaporation liquid 14 from the tank 13. The term "valve" as used herein has a broad meaning and relates to any electrical or mechanical device adapted to controllably regulate the flow rate of the fluid.

The cooling system 10 is controlled by a control unit 18. The control unit 18 is operatively coupled to the controllable discharge valve 17, and is configured for controlling operation thereof for supply of the evaporation liquid 14. The control unit 18 includes a temperature sensor 181 arranged within the body 12 at a predetermined place and is configured for producing a temperature sensor signal representative of the temperature of the body at the predetermined place. The controllable discharge valve 17 and the temperature sensor 181 may be commercially available components.

The control unit 18 also includes a controller 182 operatively coupled to the temperature sensor 181 and the supply valve 17. Specifically, the signals produced by the temperature sensor 181 can be relayed to the controller 182 via a connecting cable 183 or wirelessly. The controller 182 is responsive to the temperature sensor signal and is capable of generating control signals for controlling operation of the controllable supply valve 17 by turning it "on" or "off", thereby providing a pulsed supply of the evaporation liquid to the external surface 11 of the body 12. For example, if the temperature of the body is higher than the required temperature, the controller 182 can produce a temperature control signal to activate operation of the controllable supply valve to provide a pulsed supply of the evaporation liquid to the external surface of the body. The pulsed supply of the evaporation liquid can continue as long as required for obtaining a desired temperature decrease of the body 12 at a predetermined place.

Figure 1B:
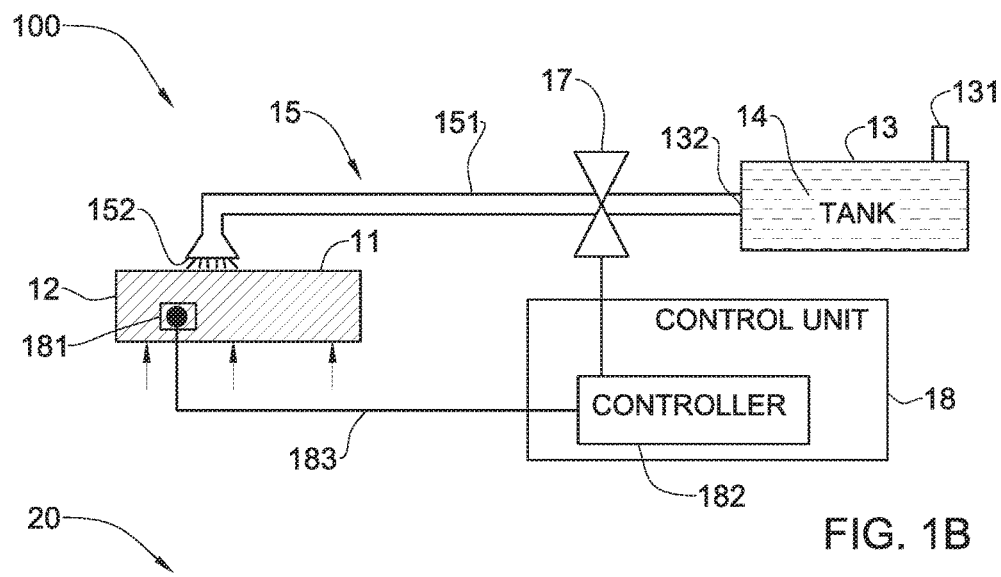
FIG. 1B illustrates a general schematic view of a cooling system, according to another embodiment of the present invention.

FIG. 1B is a schematic view of a cooling system 100 for cooling an external surface 11 of a body 12 heated by a heat source (not shown), according to another embodiment of the present invention. The cooling system 100 differs from the cooling system 10 in FIG. 1A by the fact that it includes conduit 15 that is formed as an external pipe 151. The conduit pipe 151 is in hydraulic communication with the outlet port 132 of the tank 13, and includes one or more nozzles 152 arranged at the end of the conduit pipe 151 which are used to provide a jet of the evaporation liquid 14 onto the external surface 11 of the body 12. Preferably that in this case the nozzles 152 are close to or directly in touch with the external surface.

A method for cooling the external surface 11 of the heat conductive body 12 includes controlling operation of the controllable supply valve 17 by turning it "on" or "off". The operation starts when the controllable supply valve 17 is turned off (closed) and there is no evaporation liquid 14 in the conduit 15. The body 12 is heated by the heat which is transferred from the heat source providing heat power W. The temperature sensor 181 measures temperature T of the body at the predetermined place and produces a temperature sensor signal representative of the temperature. This temperature sensor signal is relayed to the controller 182. When the temperature of the body changes to a predetermined value $\Delta T$, the controller 182 generates a control signal for controlling operation of the controllable supply valve 17 by turning it on (opening) in order to cool the body down.

According to an embodiment of the invention, the controllable supply valve 17 is opened for a predetermined time interval $\Delta t$. During the time interval $\Delta t$ the evaporation liquid contained in the conduit 15 is released from the tank 13 and supplied to the external surface 11 of the body 12 due to suction of the evaporation liquid. Such suction occurs due to a pressure gradient between the tank 13 and the external surface 11, which is exposed to a low-pressure environment. As the evaporation liquid arrives at the external surface, it evaporates, and thereby draws corresponding heat from the body. As a result, the temperature of the body decreases by $\Delta T$. Thus, the value of $\Delta T$ can serve as a temperature stabilization resolution of the temperature stabilization method.

According to an embodiment of the invention, the cooling system 10 can includes a flow meter (not shown) and a flow rate valve (not shown) arranged in the conduit 15. The flow meter is configured for measuring the flow rate J of the evaporation liquid through the conduit 15. The flow rate valve is configured to regulate the flow rate J. The flow rate can, for example, be regulated "on the fly", i.e., during operation of the cooling system.

According to another embodiment of the invention, the flow rate can be pre-calibrated by using flow meter and the flow rate valve during the fabrication and/or installation of the cooling system. In this case, the flow meter and the flow rate valve are not used after installation of the system and therefore may not be included in the system.

The amount of heat $\Delta Q$ drawn from the body away during the time interval $\Delta t$ equals to $\Delta Q = JL\Delta t$. This heat $\Delta Q$ is used to decrease the temperature T of the body 12 by $\Delta T$ and can be obtained by $\Delta Q = Mc\Delta T$, where M is the mass of the body 12, c is the specific heat capacity of the body 12, and L is the latent heat of evaporation of the evaporation liquid 14.

According to an embodiment of the invention, the time interval $\Delta t$ (which is obtained by $\Delta t = Mc\Delta T/LJ$) can be used as a duration of the open position of the valve in the pulse regime of supply of the evaporation liquid.

After operation that continued during the time interval $\Delta t$, the controllable supply valve 17 is closed (turned off), thereby interrupting supply of the evaporation liquid. During the time interval $\Delta t$ when the supply valve 17 is opened, the temperature T of the body has been decreased back by $\Delta T$. When the controllable supply valve 17 is in the closed position, the temperature of the body 12 starts again to increase due to heat transferred from the heat source. In order to decrease the temperature, the controllable supply valve 17 should be opened again.

In order to stabilize the temperature of the body, the total cooling power should be equal to the heating power. According to an embodiment of the invention, in order to maintain the temperature of the body around a certain value, the supply pulses of the evaporation liquid should be provided as a series of pulses, and the supply valve 17 should operate with a certain duty cycle. In other words, the liquid supply pulses are separated from each other by a pause, when the supply valve 17 is closed.

According to an embodiment of the invention, the operating frequency of the controllable supply valve (i.e., the repetition rate of the liquid supply pulses) can be obtained by $f = W/LJ\Delta t$, where W is the heat power of the heat source.

It should be noted that once the evaporation liquid passes through the conduit 15, it cannot be "pulled back". Therefore, the evaporation liquid that is located in the inner volume $\Delta V$ of the conduit 15 between the controllable supply valve 17 and the outlet orifice(s) 16 of the conduit 15 cannot be controlled by the controllable supply valve 17, and is inevitably sucked out to the external surface 11 and evaporates. Thus, the resolution of the cooling power of the system is, inter alia, determined by this "dead dose" of the evaporation liquid located within the conduit 15 between the controllable supply valve 17 and the outlet orifice(s) 16.

According to an embodiment of the invention, the design of the cooling system takes into account the "interplay" between the inner volume $\Delta V$ of the conduit 15 between the controllable supply valve 17 and the outlet orifice(s) 16 and the volume $\Delta v$ of the evaporation liquid released by the controllable supply valve 17 during the time interval $\Delta t$, i.e., the volume of the evaporation liquid passing through the controllable supply valve 17 in the pulse regime.

In particular, when $\Delta v \ll \Delta V$, each valve opening releases a relatively small amount of evaporation liquid into a relatively large volume of the conduit. In this case, the evaporation liquid may not reach the outlet orifice(s) 16 and evaporate within the conduit 15. Such evaporation may cause significant decrease of temperature within the conduit 15 that can result in freezing of the evaporation liquid, and thereby blocking the passage in the conduit 15 with ice. Moreover, the flow dynamic of the small volume of evaporation liquid inside the large volume of the conduit is unpredictable, especially if the conduit has more than one orifice.

On the other hand, when $\Delta v \gg \Delta V$, each valve opening releases a relatively large amount of evaporation liquid into a relatively small volume of the conduit. In this case, most of the released liquid is supplied to the external surface 11 of a body 12 and cools the body. It should be understood that this case is not practical, especially in the case when the conduit is tiny and therefore may be costly in fabrication. Therefore, there is no need in fabrication of such conduits.

Thus, according to an embodiment of the invention, the controllable operation of the cooling system is optimally carried out when the volume $\Delta v$ of the evaporation liquid released by the controllable supply valve 17 during the time interval $\Delta t$ is about the inner volume $\Delta V$ of the conduit 15 between the controllable supply valve 17 and the outlet orifice(s) 16, i.e., $\Delta v \approx \Delta V$. In this case, the inner volume $\Delta V$ of the conduit between the controllable supply valve and an opening through which the evaporation liquid is supplied to the external surface of the body, has a predetermined value obtained by $\Delta V = Mc\Delta T/L\rho$, where $\rho$ is the density of the evaporation liquid.

The calculated value $\Delta V$ can be taken into account for design and manufacturing of the conduit 15 and especially the portion of the conduit 15 between the controllable supply valve 17 and the outlet orifice(s) 16.

In the present invention, the term "about" for the deviation of the value $\Delta v$ from the value $\Delta V$ refers to a value, amount, or degree that is approximate or near to each other. The term "about" means within a statistically meaningful range of a value and indicates a reasonable amount of deviation caused by the differences between, inter alia, the flow rate J of the evaporation liquid in different parts of the conduit 15, that does not bring about a considerable change as a result. The extent of variation of value $\Delta v$ from the value $\Delta V$ encompassed by the term "about" is that which is typical for the tolerance levels or measurement conditions. The allowable variation encompassed by the term "about" depends on the particular system under consideration, and can be readily appreciated by one of ordinary skill in the art. This approximation for the purpose of the present invention can, for example, be interpreted so as to include an error of 20% at least, as long as there is no considerable change in the performance of the system due to the deviation.

It should be understood that evaporation rate of an evaporation liquid depends on several factors affecting the evaporation process.

In particular, if the environment surrounding the external surface of the body 12 already has a high concentration of the substance of the evaporation liquid or other substances, then the evaporation liquid 14 released from the conduit 15 will evaporate at a slower rate. Furthermore, environment pressure of the gas surrounding the external surface of the body 12 affects the evaporation rate. Moreover, the temperature and enthalpy of vaporization of the evaporation liquid affects the evaporation rate.

It should also be understood that an evaporation liquid which is spread over a larger surface area will evaporate faster, as there are more surface molecules per unit of volume that are potentially able to escape. The area of the external surface 11 of the body 12 covered with the evaporation liquid can, for example, be increased by enhancing wetting characteristics of the evaporation liquid. The wetting characteristics can, for example, be improved by treatment of the external surface 11 of the body.

According to an embodiment of the present invention, the surface is covered by a layer (not shown in FIGS. 1A and 1B) of material having molecules attractable to the molecules of the evaporation liquid. For example, when the evaporation liquid is water, the external surface 11 of the body 12 can be covered by a layer of a hydrophilic material. Examples of hydrophilic materials suitable for the purpose of the cooling system of the present invention include, but are not limited to, cellulose, polyamides, polyacrylic amides, polyurethanes with polyethylene glycol ether soft segments, ethoxylated graft polymers, etc.

In certain conditions, such as in a vacuum and/or with zero gravity, it can be complicated to apply evaporant to the external surface of the body. For instance, in spray cooling by the system shown in FIG. 1B, the evaporant droplets are exposed to the vacuum as they leave the nozzle. Once a droplet is exposed to a vacuum, it starts to evaporate. The temperature of the droplet decreases, and it may freeze. Once the droplet has frozen it may bounce back from the external surface upon arriving at the surface. In such a case, the cooling mechanism fails, since evaporation from the surface does not occur.

Likewise, in the case of zero gravity conditions, the evaporation liquid provided by the conduit may not stick to the external surface as it is released from the outlet orifices 16 of the conduit in the system shown in FIG. 1A or from the nozzle 152 of the conduit in the system shown in FIG. 1B.

Figure 2:
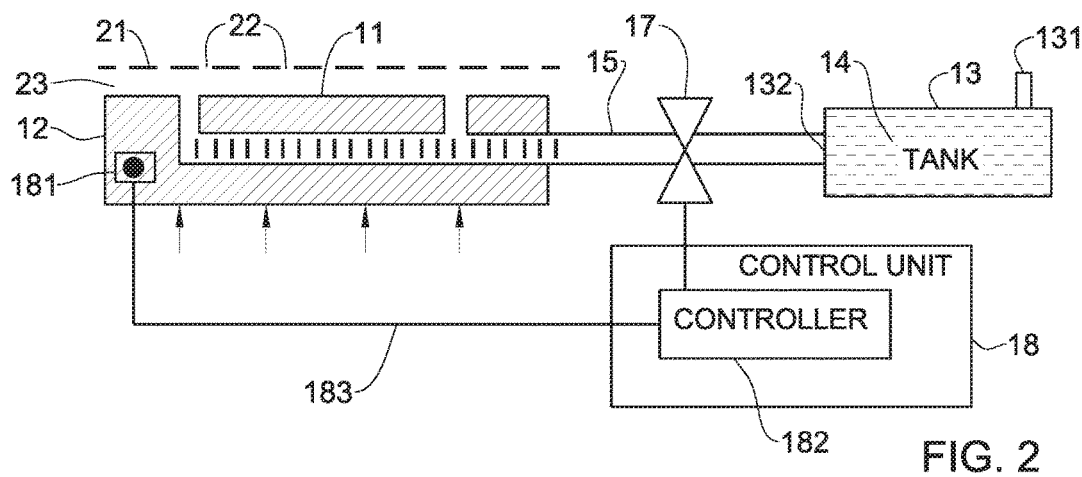
FIG. 2 illustrates a general schematic view of a cooling system, according to a further embodiment of the present invention.

Referring to FIG. 2, a schematic view of a cooling system 20 for cooling an external surface 11 of a heat conductive body 12 heated by a heat source (not shown) is illustrated, according to a further embodiment of the present invention. According to this embodiment, the cooling system 10 includes a grid 21 arranged over the external surface 11 of the body 12 at a predetermined distance. The grid 21 is configured for catching the evaporation liquid 14 provided by the conduit 15, and holding the evaporation liquid in openings 22 of grid 21, and in a gap 23 between the grid 21 and the external surface 11. The grid has appropriate dimension of the openings 22, and is made from a suitable metal or plastic material, which can hold the evaporation liquid 14 in the openings 22. Preferably, that the material of the grid is a wettable material. The openings 22 of the grid 21 can, for example, have dimensions of about 1×1 mm$^2$, while the gap 23 can be in the range of about 0.2 mm to 1 mm. In this case, the grid 21 can hold a sufficient layer of evaporation liquid 14 caught between the grid 21 and the external surface 11, even at zero gravity, and provide the cooling process.

It should be noted that the diameter of the conduit should be large enough so that the evaporation liquid may not freeze in the conduit located within the body before reaching the external surface. For the provision shown in FIG. 1A, the mass and thermal conductivity of the heat conductive body should also be selected to avoid freezing of the evaporation liquid, since such freezing can prevent operation of the cooling control method described above.

In order to illustrate operation of the cooling system and method of the present invention, a prototype system has been fabricated. The prototype system has an aluminum heat conductive body having a rectangular prism shape of 50×43×6 mm$^3$. A heat source that generates heat includes two electrical resistors connected to an aluminum plate having a rectangular prism shape of 50×43×3.5 mm$^3$. The surface of the heat source plate, having dimensions of 50×43 mm$^2$, was attached to the surface of the heat conductive body having similar dimensions.

A low-pressure environment having pressure of 2 Torr was provided in a vacuum chamber having dimensions of 600×600×600 mm$^3$. Four thermocouples (temperature sensor) were mounted within the plate body in different places.

A brass pipe was used as a conduit arranged within the body. A controllable supply valve was arranged in the conduit. A volume $\Delta v$ of the conduit between the controllable supply valve and orifices of the conduit on the surface of the body was 150 mm$^3$.

Water at the atmospheric pressure stored in a tank was used as evaporant. The constant flow rate J of 3 gram/sec was provided through the conduit. In operation, the controllable supply valve supplied water pulses having duration (width) of $\Delta t=50$ milliseconds. The frequency of the pulses was varied to illustrate the dependency of the cooling temperature of the body on frequency.

A grid formed from plastic wires of 0.3 mm diameter and having cell size of 1×1 mm$^2$ was mounted over the external surface of the plate body placed in the vacuum chamber (together with the heat source). The gap between the grid and the external surface of the body was 0.5 mm. A water layer formed in the gap can facilitate catching and holding the water on the external surface until complete evaporation.

Figure 3:
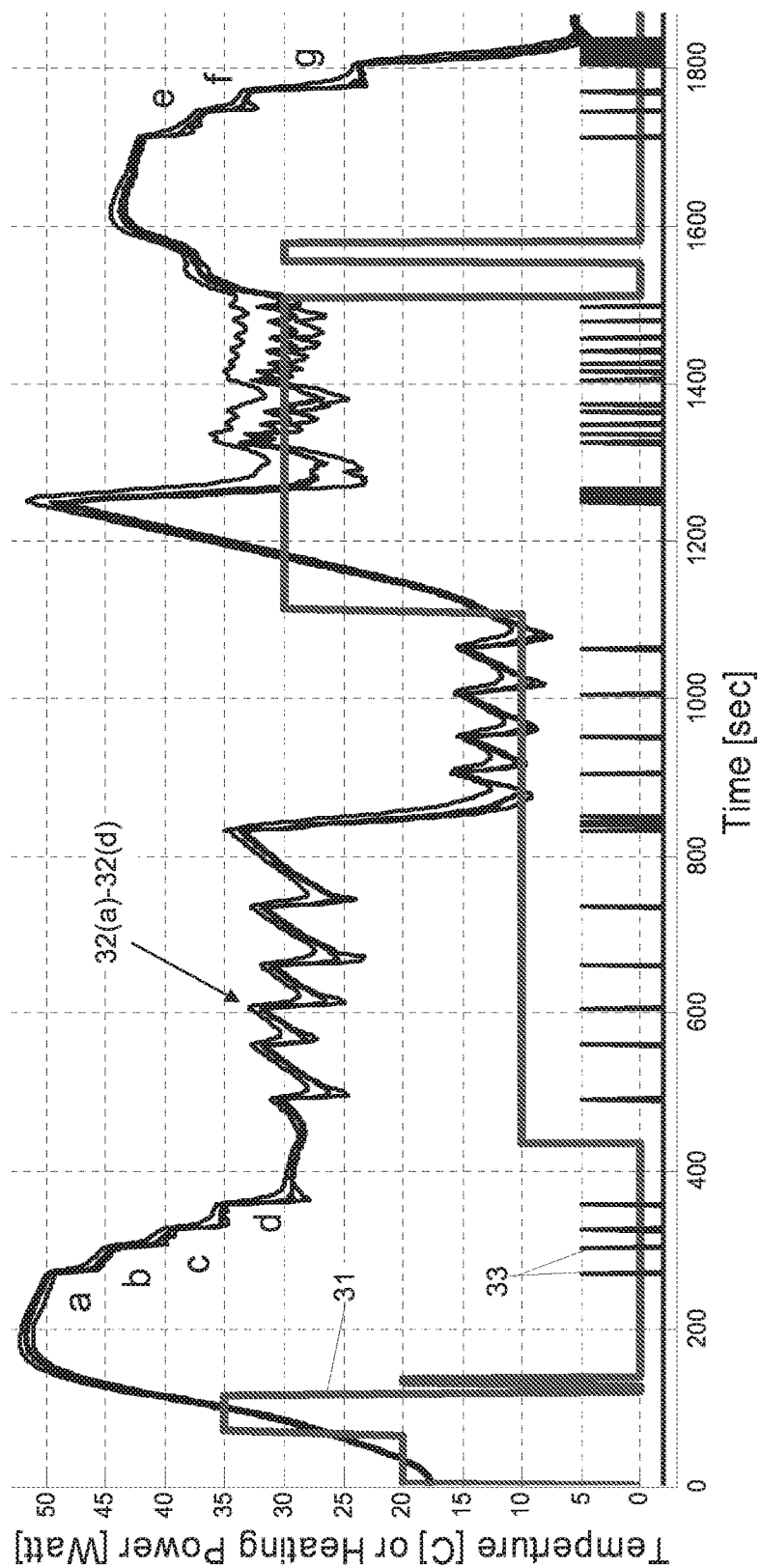
FIG. 3 illustrates exemplary graphs depicting the time dependence of the heating power supplied to the body, and the temperature of the body measured at four different places within the body during operation of the cooling system shown in FIG. 2.

Experimental results obtained from the prototype system are illustrated in FIG. 3. Specifically, FIG. 3 illustrates exemplary graphs depicting the time dependence of the heating power (curve 31) supplied to the body, and the temperature (curve 32a, 32b, 32c and 32d) of the body measured at four different places.

Each spike 33 indicates a single opening of the valve during $\Delta t=50$ milliseconds.

In operation, during the first 140 seconds, the heat source operates with variable heating power. After about 200 seconds, the temperature reaches its maximum value of about 53 degrees, and then gradually decreases by cooling the environment. Due to the applying of four discrete evaporant doses, heat quantities drawn from the body are also discrete, resulting in temperature steps, which are indicated by stages a-d. These four stages of temperature decrease (each temperature drop of approximately 5 degrees) correspond to four openings of the valve, and are the manifestation of the parameter $\Delta T$. Similar results of temperature decrease are shown in stages e-g obtained during the interval of operation of 1700-1800 sec. These temperature steps define the temperature stabilization resolution of the prototype system. In order to provide a smaller temperature resolution, smaller temperature drops must be made. As explained above, this can, for example, be achieved by using a different evaporant, shorter valve opening time $\Delta t$ and/or smaller volume $\Delta v$ of the conduit.

At the moment corresponding to 430 seconds of operation, a 10 watt heating power was applied, and a sequence of openings of the valve was performed until the moment of 735 seconds. As can be seen, each time when the valve was open, the temperature dropped to about 25 degrees, while the temperature rose above 33 degrees when the valve was closed, with an attempt to stabilize the system occurring at about 30 degrees. The frequency of the water pulse in this time interval was about 1/55 Hz. A similar result is seen during operation of the system between 870 to 1070 seconds, where the stabilization temperature was about 12 degrees.

During operation of the system between 1300 to 1500 seconds, a 30 watt heating power was applied. In this case, to stabilize the system temperature at about 30 degrees, the frequency of water pulses was 1/16 Hz. Since in this case the heating power of the heating source was three times larger than heating power provided between 870 to 1070 seconds, the pulse frequency is also approximately three times higher. In this case, a temperature difference of about 3 degrees was observed between the data provided by the thermocouples.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A system for cooling an external surface of a heat conductive body heated by a heat source, the system comprising:
a tank containing an evaporation liquid having a pressure greater than a pressure of an environment near the external surface;
a conduit in hydraulic communication with the tank and configured to supply the evaporation liquid to the external surface of the heat conductive body;
a controllable supply valve arranged within the conduit, the controllable supply valve configured for regulating a flow rate of egress of the evaporation liquid from the tank; and
a control unit operatively coupled to the controllable discharge valve, the control unit configured for controlling operation thereof for supply of the evaporation liquid, the control unit comprising:
a temperature sensor arranged within the heat conductive body at a predetermined place and configured for producing a temperature sensor signal representative of the temperature of the heat conductive body at the predetermined place; and
a controller operatively coupled to the temperature sensor and to the controllable supply valve, the controller being responsive to the temperature sensor signal and being capable of generating control signals for controlling operation of the controllable supply valve by turning the controllable supply on or off, thereby to provide a pulsed supply of the evaporation liquid to the external surface of the heat conductive body as long as required for obtaining a desired temperature decrease of the heat conductive body at the predetermined place;
wherein the pulsed supply of the evaporation liquid is characterized by a duration $\Delta t$ of the liquid supply pulses and a valve operating frequency; and
wherein the duration $\Delta t$ of each pulse of said pulsed supply of the evaporation liquid is obtained by $\Delta t = Mc\Delta T/LJ$, where M is the mass of the body, c is the specific heat capacity of the body, $\Delta T$ is the desired temperature decrease; L is the latent heat of evaporation of the evaporation liquid, and J is the flow rate of the evaporation liquid through the conduit.

2. The system of claim 1, wherein the control unit includes a flow meter and a flow rate valve arranged in the conduit; the flow meter configured for measuring the flow rate of the evaporation liquid in the conduit, and the flow rate valve configured to regulate the flow rate.

3. The system of claim 1, wherein an operating frequency of the controllable supply valve is obtained by $f = W/LJ\Delta t$, where W is the heat power of the heat source.

4. A system, for cooling an external surface of a heat conductive body heated by a heat source, the system comprising:
a tank containing an evaporation liquid having a pressure greater than a pressure of an environment near the external surface;
a conduit being in hydraulic communication with the tank and configured to supply the evaporation liquid to the external surface of the body;
a controllable supply valve arranged within the conduit, and configured for regulating a flow rate of egress of the evaporation liquid from the tank; and
a control unit operatively coupled to said controllable discharge valve, and configured for controlling operation thereof for supply of the evaporation liquid, the control unit comprising:
a temperature sensor arranged within the body at a predetermined place and configured for producing a temperature sensor signal representative of the temperature of the body at the predetermined place; and
a controller operatively coupled to said temperature sensor and to said controllable supply valve, said controller being responsive to said temperature sensor signal and being capable of generating control signals for controlling operation of said controllable supply valve by turning it "on" or "off", thereby to provide a pulsed supply of the evaporation liquid to the external surface of the body as long as required for obtaining a desired temperature decrease of the body at the predetermined place;

wherein an inner volume of the conduit between the controllable supply valve and an opening through which the evaporation liquid is supplied to the external surface of the heat conductive body has a predetermined value obtained by $\Delta V \approx Mc\Delta T/L\rho$, where M is the mass of the heat conductive body, c is the specific heat capacity of the heat conductive body, $\Delta T$ is the desired temperature decrease, L is the latent heat of evaporation of the evaporation liquid and $\rho$ is the density of the evaporation liquid.

5. The system of claim 1, further comprising a grid arranged over the external surface of the heat conductive body at a predetermined distance, and configured for catching the evaporation liquid provided by the conduit, and holding the evaporation liquid in a gap between the grid and the external surface.

6. A method for cooling an external surface of a heat conductive body, the method comprising:
   providing a system comprising:
      a tank containing an evaporation liquid having a pressure greater than a pressure of an environment near the external surface;
      a conduit being in hydraulic communication with the tank and configured to supply the evaporation liquid to the external surface of the body;
      a controllable supply valve arranged within the conduit, and configured for regulating a flow rate of egress of the evaporation liquid from the tank; and
      a control unit operatively coupled to said controllable discharge valve, and configured for controlling operation thereof for supply of the evaporation liquid, the control unit comprising:
         a temperature sensor arranged within the body at a predetermined place and configured for producing a temperature sensor signal representative of the temperature of the body at the predetermined place; and
         a controller operatively coupled to said temperature sensor and to said controllable supply valve, said controller being responsive to said temperature sensor signal and being capable of generating control signals for controlling operation of said controllable supply valve by turning it "on" or "off", thereby to provide a pulsed supply of the evaporation liquid to the external surface of the body as long as required for obtaining a desired temperature decrease of the body at the predetermined place;
   controlling operation of the controllable supply valve by turning the controllable supply valve on or off, thereby providing a pulsed supply of the evaporation liquid to the external surface of the heat conductive body as long as required for obtaining a desired temperature decrease of the heat conductive body at the predetermined place;
   wherein said pulsed supply of the evaporation liquid is characterized by a duration $\Delta t$ of the liquid supply pulses and a valve operating frequency; and
   wherein each pulse of said pulsed supply of the evaporation liquid is obtained by $\Delta t = Mc\, \Delta T/LJ$, where M is the mass of the body, c is the specific heat capacity of the body, $\Delta T$ is the desired temperature decrease; L is the latent heat of evaporation of the evaporation liquid and J is the flow rate of the evaporation liquid through the conduit.

7. The method of claim 6, wherein an operating frequency of the controllable supply valve is obtained by $f = W/LJ\Delta t$, where W is a heat power of the heat source.

* * * * *